US008224308B1

(12) United States Patent  
Gavrylyako et al.

(10) Patent No.: US 8,224,308 B1
(45) Date of Patent: Jul. 17, 2012

(54) MOBILE DEVICE CATALOG REGISTRATION BASED ON USER AGENTS AND CUSTOMER SNAPSHOTS OF CAPABILITIES

(75) Inventors: Olga Volodymyrivna Gavrylyako, Fremont, CA (US); Zhaowei Charlie Jiang, Palo Alto, CA (US); Nigel Choi, San Carlos, CA (US); Heidi Ann Pollock, San Francisco, CA (US); Daniel John Woods, Santa Cruz, CA (US); Jeff Leung, Mountain View, CA (US); James Liang, Mountain View, CA (US); Michael Jeremy Temkin, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 443 days.

(21) Appl. No.: 11/537,324

(22) Filed: Sep. 29, 2006
(Under 37 CFR 1.47)

(51) Int. Cl.
*H04M 11/00* (2006.01)
*H04M 3/00* (2006.01)
*H04M 3/16* (2006.01)
*H04M 1/00* (2006.01)

(52) U.S. Cl. ............... 455/418; 455/405; 455/556.2; 455/411

(58) Field of Classification Search .......... 455/418
See application file for complete search history.

(56) References Cited

U.S. PATENT DOCUMENTS

| | | | | |
|---|---|---|---|---|
| 5,581,479 A | * | 12/1996 | McLaughlin et al. | 725/145 |
| 5,907,800 A | * | 5/1999 | Johnson et al. | 455/405 |
| 6,373,949 B1 | * | 4/2002 | Aura | 380/247 |
| 6,987,987 B1 | * | 1/2006 | Vacanti et al. | 455/556.2 |
| 7,483,983 B1 | * | 1/2009 | Bonefas et al. | 709/226 |
| 2002/0107891 A1 | * | 8/2002 | Leamon et al. | 707/513 |
| 2003/0208444 A1 | * | 11/2003 | Sauer | 705/40 |
| 2003/0217118 A1 | * | 11/2003 | Kobayashi et al. | 709/218 |
| 2004/0082314 A1 | * | 4/2004 | Shaw et al. | 455/411 |

OTHER PUBLICATIONS

"Volantis: Content Delivery Platform," Volantis Systems, 9 pages, http://www.volantis.com/content-delivery-platform (accessed Aug. 29, 2008).
"Captcha," (Mar. 12, 2006). In *Wikipedia, The Free Encyclopedia*, 07:41 UTC. Wikimedia Foundation, Inc. accessed Feb. 26, 2007, http://en,wikipedia.org/w/index.php?title=Captcha&oldid=43407448.
"Turing test," (Feb. 20, 2007). In *Wikipedia, The Free Encyclopedia*. 12:23 UTC. Wikimedia Foundation, Inc. (accessed Feb. 26, 2007). http://en.wikipedia.org/w/index.php?title=Turing_test&oldid=109540488.
Sybase Performance and Tuning: Locking, Adaptive Server Enterprise 12.5.1, Chapter 7 How Indexes Work, Aug. 2003, p. 125-126.
Passani, L., "What's the WURFL?" (accessed Oct. 24, 2007) http://wurfl.sourceforge.net.
Passani, L., "Welcome to the WURFL, the Wireless Universal Resource File," (accessed Oct. 24, 2007) http://wurfl.sourceforge.net.
Office Communication for U.S. Appl. No. 11/537,444 mailed Dec. 29, 2009.

(Continued)

*Primary Examiner* — Lester Kincaid
*Assistant Examiner* — Andy Gu
(74) *Attorney, Agent, or Firm* — Frommer Lawrence & Haug LLP; Jamie L. Wiegand

(57) ABSTRACT

A network device, system, and method are directed towards a mobile device catalog that contains capability information about a variety of mobile devices including, for example, the mobile device type, mobile carrier, and mobile browser. The capability information can be used to tailor content requested by the mobile device.

16 Claims, 7 Drawing Sheets

OTHER PUBLICATIONS

Office Communication for U.S. Appl. No. 11/537,444 mailed Aug. 3, 2010.
Office Communication for U.S. Appl. No. 11/537,444 mailed Oct. 18, 2010.
Office Communication for U.S. Appl. No. 11/537,444 mailed Sep. 16, 2011.
Office Communication for U.S. Appl. No. 11/538,780 mailed Feb. 13, 2009.
Office Communication for U.S. Appl. No. 11/538,780 mailed Sep. 16, 2009.
Office Communication for U.S. Appl. No. 11/538,780 mailed Dec. 2, 2009.
Office Communication for U.S. Appl. No. 11/538,780 mailed Jan. 29, 2010.
Office Communication for U.S. Appl. No. 11/538,780 mailed Aug. 16, 2010.
Office Communication for U.S. Appl. No. 11/538,780 mailed Mar. 10, 2011.
Office Communication for U.S. Appl. No. 11/538,780 mailed Aug. 21, 2011.
Office Communication for U.S. Appl. No. 11/537,601 mailed Sep. 16, 2009.
Office Communication for U.S. Appl. No. 11/537,601 mailed Apr. 28, 2010.
International Search Report and Written Opinion for International Patent Application No. PCT/US2007/070137 mailed Nov. 19, 2007.
International Search Report and Written Opinion for International Patent Application No. PCT/US2007/072796 mailed Dec. 3, 2007.
International Preliminary Report on Patentability for International Patent Application No. PCT/2007/072796 mailed Apr. 9, 2009.
European Search Report for European Patent Application No. 07799303.8-2201 mailed Dec. 9, 2009.
Office Communication for Chinese Patent Application No. 200780036416.7 mailed May 21, 2010.
Office Communication for Chinese Patent Application No. 200780036416.7 mailed Jul. 6, 2011.
Office Communication for Chinese Patent Application No. 20070037485.X mailed Sep. 26, 2011.
Office Communication for Japanese Patent Application No. 2009530488 mailed Apr. 27, 2011.
Office Communication for Japanese Patent Application No. 2009531496 mailed May 16, 2011.
Office Communication for Korean Patent Application No. 10-2009-7008424 mailed Feb. 10, 2011.
Office Communication for Korean Patent Application No. 10-2009-7008781 mailed Jan. 13, 2011.
Office Communication for U.S. Appl. No. 11/536,975 mailed Jun. 8, 2009.
Office Communication for U.S. Appl. No. 11/536,975 mailed Apr. 22, 2010.
Office Communication for U.S. Appl. No. 11/536,975 mailed Oct. 7, 2010.
Office Communication for U.S. Appl. No. 11/536,975 mailed Mar. 16, 2011.
Office Communication for U.S. Appl. No. 11/536,975 mailed May 27, 2011.
Office Communication for U.S. Appl. No. 11/537,003 mailed Jun. 22, 2009.
Office Communication for U.S. Appl. No. 11/537,003 mailed Apr. 12, 2010.
Office Communication for U.S. Appl. No. 11/537,003 mailed Sep. 2, 2010.
Office Communication for U.S. Appl. No. 11/537,003 mailed Mar. 1, 2011.
Office Communication for U.S. Appl. No. 11/537,003 mailed May 5, 2011.
Office Communication for U.S. Appl. No. 11/537,447 mailed Apr. 3, 2009.
Office Communication for U.S. Appl. No. 11/537,447 mailed Nov. 13, 2009.
Office Communication for U.S. Appl. No. 11/537/447 mailed Jan. 28, 2010.
Office Communication for U.S. Appl. No. 11/537,447 mailed Mar. 22, 2010.
Office Communication for U.S. Appl. No. 11/537,447 mailed Aug. 4, 2010.
Office Communication for U.S. Appl. No. 11/537,447 mailed Oct. 12, 2010.
Office Communication for U.S. Appl. No. 11/537,447 mailed Dec. 22, 2010.
Office Communication for U.S. Appl. No. 11/537,447 mailed Aug. 19, 2011.
Office Communication for U.S. Appl. No. 11/537,507 mailed May 26, 2010.
Office Communication for U.S. Appl. No. 11/537,593 mailed Sep. 3, 2009.
Office Communication for U.S. Appl. No. 11/537,593 mailed Apr. 28, 2010.
Office Communication for U.S. Appl. No. 11/537,593 mailed Jul. 22, 2011.
Office Communication for U.S. Appl. No. 11/933,082 mailed Jul. 12, 2011.

* cited by examiner

MOBILE DEVICE CATALOG REGISTRATION BASED ON USER AGENTS AND CUSTOMER SNAPSHOTS OF CAPABILITIES

FIELD

The present invention relates generally to mobile communications and, more particularly, but not exclusively to methods and systems for providing services to a range of different mobile devices.

BACKGROUND

The growth of the Internet has brought a corresponding increase in the number and variety of computing devices being employed to communicate over the Internet. Today's computing devices vary from desktop computers with a large variety of features and capabilities, to mobile devices such as pagers, cellular phones, personal digital assistants (PDAs), and the like, with lesser features and/or capabilities. For example, many of these computing devices include some form of Internet browsing capability. In addition, many of the computing devices are configured to allow users access to audio files, and/or graphical files via wireless and/or wired networks.

Computing devices, and in particular mobile devices, can have very different hardware parameters, software implementation, standards, and bugs potentially making consistent delivery of content to a variety of different devices difficult. While a number of techniques exist to customize content for a particular mobile device, or other computing device, these techniques may not provide content in a suitable arrangement to other devices.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
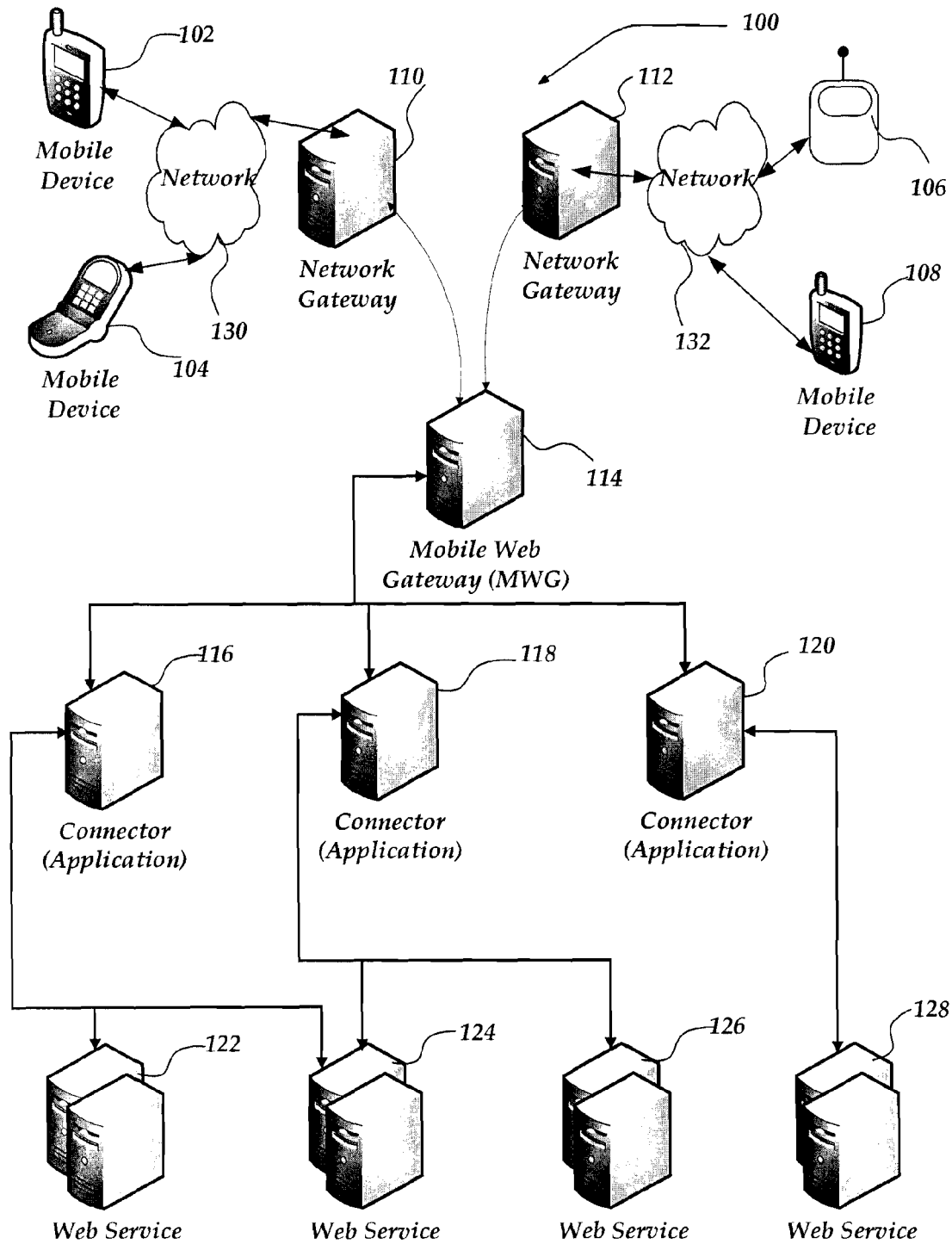
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to any form of data that may be communicated over a network between network devices. Content may therefore include, but is not limited to a web page, a graphic, an audio clip, a video clip, a file, a binary file, a document, or the like.

Briefly stated the present invention is directed towards systems and methods that utilize a device catalog for providing capability information about a plurality of devices. Also the invention is directed towards systems and method for updating a device catalog when a new device is encountered. The device catalog provides capability information for the mobile device based on, for example, the mobile device type, the mobile carrier, and the mobile browser. This capability information can be used to modify web content for delivery to the mobile device.

The mobile device catalog can be updates when an unknown mobile device makes a request. In one embodiment, at least the mobile device type and mobile carrier for the unknown mobile device are identified, preferably from the request. Based on this identification information, a profile is obtained for the unknown mobile device and capability information for the unknown mobile device is determined, at least in part, from the profile. The mobile device catalog can then be updated with the capability information. In one embodiment, this mobile device catalog is a master mobile device catalog that is then used to periodically update multiple local device catalogs.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes mobile devices (client devices) 102-108, networks 130, 132, network gateways 110, 112, mobile web gateway 114, connectors 116-120, and web services 122-128.

One embodiment of mobile devices 102-108 is described in more detail below in conjunction with FIG. 2. Generally, however, mobile devices 102-108 may include virtually any portable computing device capable of receiving and sending a message over a network, such as networks 110, 112, or the like. Mobile devices 102-108 may also be described generally as client devices that are configured to be portable. Mobile devices 102-108 may have the capability of connecting to a network using wireless technology, wired connections, or a combination of both wired and wireless connections. Thus, mobile devices 102-108 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-108 typically range widely in terms of capabilities and features. For example, a cell phone may have a numeric keypad and a few lines of monochrome LCD display on which only text may be displayed. In another example, another cell phone or web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, video, multimedia, and the like, employing virtually any web based language or protocol, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-108 may include one or more other client applications that are configured to receive content from another computing device. The client application may include a capability to provide and receive textual content, graphical content, audio content, video content, and the like. The client application may further provide information that identifies itself, including a type, capability, name, and the like. In one embodiment, mobile devices 102-108 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to mobile web gateway 114, connectors 116-120, or other computing devices.

Mobile devices 102-108 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as mobile web gateway 114, connectors 116-120, or the like. However, the present invention is not limited to these message protocols, and virtually any other message protocol may be employed.

Mobile devices 102-108 may be further configured to enable a user to participate in communications sessions, such as IM sessions. As such, mobile devices 102-108 may include a client application that is configured to manage various actions on behalf of the client device. For example, the client application may enable a user to interact with the browser application, email application, IM applications, SMS application, and the like.

Mobile devices 102-108 may further be configured to include a client application that enables the end-user to log into an end-user account that may be managed by a network application, such as connectors 116-120. Such end-user account, for example, may be configured to enable the end-user to receive emails, send/receive IM messages, SMS messages, access selected web pages, participate in a social networking activity, or the like.

Networks 130, 132 are configured to couple mobile devices 102, 104 and 106, 108, respectively and its components with network gateways 110, 112, respectively. Networks 130, 132 may include any of a variety of wireless sub-networks that may further overlay stand-alone ad-hoc networks, and the like, to provide an infrastructure-oriented connection for mobile devices 102-108. Such sub-networks may include mesh networks, Wireless LAN (WLAN) networks, cellular networks, and the like. Additionally, networks 130, 132 may connect to mobile devices with a wired connection, such as cable, phone lines, Ethernet wires, and the like. The invention may be used either generally with networks, specifically with wireless networks, or with various combinations of wireless and wired networks. Networks 130, 132 may be completely distinct from each other, may share components, or may be the same network.

Networks 130, 132 may further include an autonomous system of terminals, gateways, routers, and the like connected by wireless radio links, and the like. These connectors may be configured to move freely and randomly and organize themselves arbitrarily, such that the topology of networks 130, 132 may change rapidly.

Networks 130, 132 may further employ a plurality of access technologies including 2nd (2G) and 3rd (3G) generation radio access for cellular systems, WLAN, Wireless Router (WR) mesh, and the like. Access technologies such as 2G, 3G, and future access networks may enable wide area coverage for mobile devices, such as mobile devices 102-108 with various degrees of mobility. For example, networks 130, 132 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, networks 130, 132 may include virtually any communication mechanism by which information may travel between mobile devices 102-108 and another computing device, network, and the like.

Network gateways 110, 112 are computing devices that serve as intermediaries between mobile devices 102-108 and other network devices, such as mobile web gateway 114, and connectors 116-120. A network gateway 110, 112 may reside within a mobile carrier's network, or may be external to the network. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ differing protocols. A WAP gateway is one type of network gateway. A WAP gateway may facilitate communication between a first device that uses the Wireless Application Protocol (WAP), and a second device. The second device may, for example, communicate using the HyperText Transfer Protocol (HTTP). An SMS gateway is a network gateway that facilitates communication between a device using the Short Message Service (SMS) protocol and another device, such as one using HTTP. A WAP and SMS gateway combines the features of a WAP gateway and an SMS gateway. Network gateways 110, 112 may include a WAP gateway, an SMS gateway, or other types of network gateways or combinations thereof.

Network gateways 110, 112 may have different functionality or different attributes from each other. For example, each may use a different protocol, including a different version of a protocol, from the other. Each network gateway may have different software, different software versions, or different hardware that results in differences in communications or functionality. For example, one network gateway may have a version of software that has a particular bug in it, while the other may have a newer version without the bug, whereas the bug may cause differences in communications. Network gateways may also differ in their security features, such that one filters out or modifies a communication while another one allows a similar communication to be forwarded without the modification.

FIG. 1 shows network gateways 110, 112 communicating with mobile web gateway 114, mobile web gateway communicating with each of connectors 116-120, and connectors 116-120 each communicating with one or more of web services 122-128. Each of these communications may employ a direct connection, or one or more networks, or a combination thereof.

A network enabling any one or more of the above communications may employ any form of computer readable media for communicating information from one electronic device to another. Also, the network can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network includes any communication method by which information may travel between network gateways 110, 112, mobile web gateway 114, connectors 116-120, web services 122-128, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of mobile web gateway 114 is described in more detail below in conjunction with FIG. 3. Briefly, however, mobile web gateway 114 may include any computing device capable of connecting to one or both of network gateways 110, 112, as well as additional network gateways, to enable network applications or web sites to process and respond to requests from mobile devices.

Devices that may operate as mobile web gateway 114 include personal computers desktop computers, multiprocessor systems, microprocessor-based or programmable consumer electronics, network PCs, servers, and the like, or any combination thereof.

Although FIG. 1 illustrates mobile web gateway 114 as a single computing device, the invention is not so limited. For example, one or more functions of mobile web gateway 114 may be distributed across one or more distinct computing devices. For example, receiving requests, extracting information from requests, retrieving data associated with requests or with mobile devices and network gateways, sending requests and associated data to connectors, receiving responses, processing, enhancing, and formatting responses, and sending responses to requesting devices, or the like, may be performed by a plurality of computing devices, without departing from the scope or spirit of the present invention.

As illustrated in FIG. 1, mobile web gateway 114 communicates with one or more connectors 116-120. Connectors are network applications that may include business logic and presentation logic. This logic may include decisions on how to respond to a request, what information to present in a response, and how to present the information. The presentation decisions may include decisions as to how a response page may appear, or where on a page information may appear. Connectors communicate with other computing devices, such as mobile devices 102-108. As discussed in further detail below, connectors 116-120 may receive requests, process the requests, and respond to the requests. The requests may include requests for information, requests to perform an action, requests to store or retrieve data, requests to communicate with other computing devices, and the like, or combinations thereof. In response to requests, connectors 116-120 may communicate with other data storage devices or computing devices, such as web services 122-128.

Connectors 116-120 may include any computing device capable of communicating with other computing devices and performing the functions described herein. Connectors 116-120 may include software programmed to facilitate these functions. A connector may be considered to be a computing device, software residing on a computing device, or a combination thereof. A computing device may include one or more connectors. A connector may include one or more computing devices.

Web services 122-128 represents a variety of services that may provide information or perform actions in response to requests from mobile devices. Such services include, but are not limited to information services, third-party services, audio services, video services, email services, IM services, SMS services, VOIP services, calendaring services, photo services, or the like. These services may provide a variety of content, such as news, stock data, web postings, and the like. The services may also provide individualized services such as banking, financial management, educational services, shopping, and the like. Devices that may operate as web services 122-128 include personal computers desktop computers, multiprocessor systems, microprocessor-based or programmable consumer electronics, network PCs, servers, and the like. A web service may be in a single location, or geographically distributed. A single computing system may provide one or more web services, and a web service may employ one or more computing systems.

Illustrative Mobile Client Environment

Figure 2:
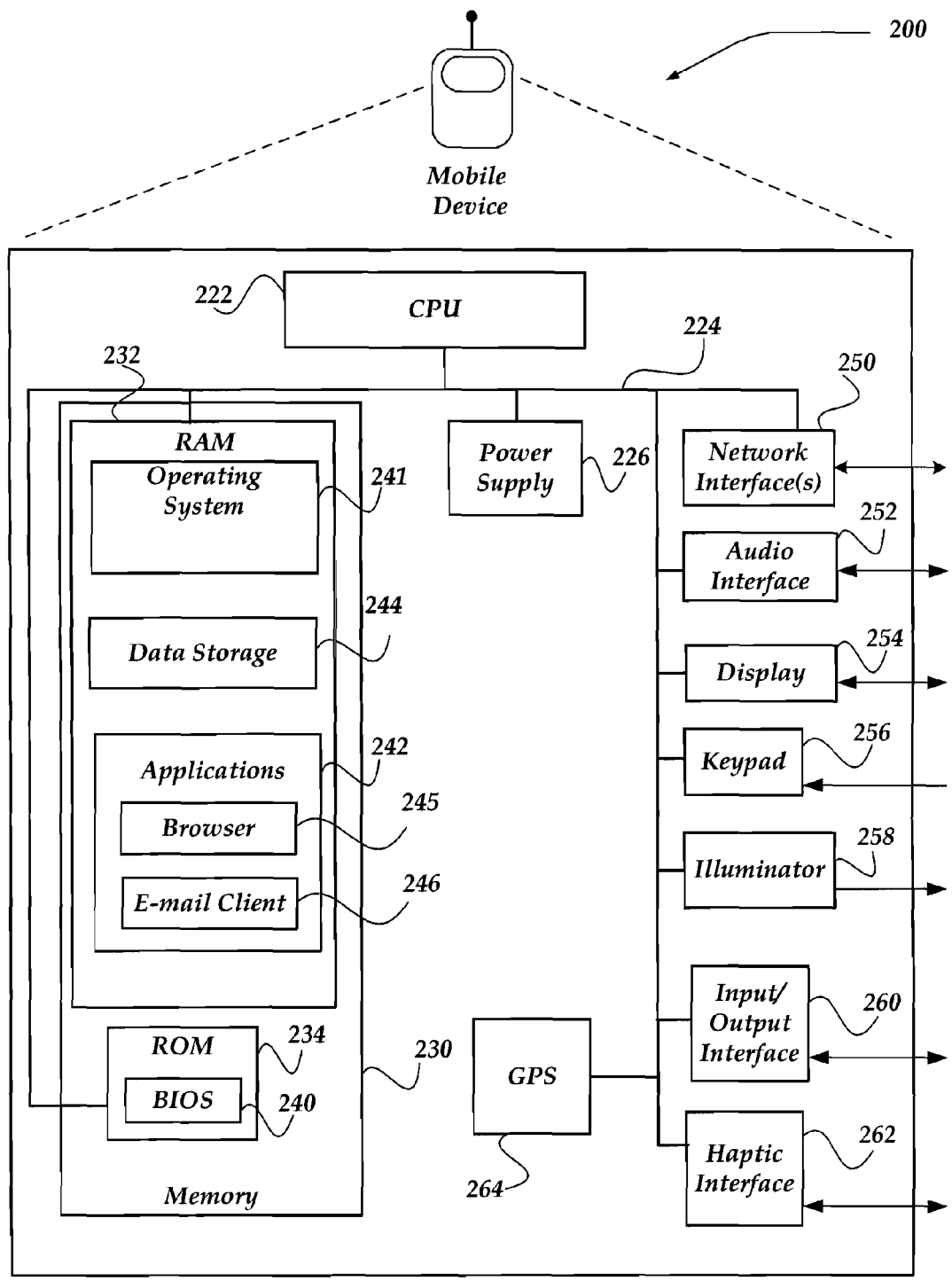
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-108 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may, through other components, provide other information that may be employed to determine a physical location of the device, including for example, a MAC address, IP address, or the like.

Mass memory 230 includes a RAM 232, a ROM 234, and other storage means. Memory 230 may include a volatile memory, a non-volatile memory such as flash memory, or both. Memory 230 may include a non-volatile memory that is easily removable by a user. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage components 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store a user's personal preferences, such as preferred colors, security parameters, audio preferences, or the like. Some personal preferences may relate to how pages or other information is received and displayed on the display 254. Data storage may also include data that is received from a web site or application and is passed back to the web site or application. This information may be referred to as a "cookie". An HTTP cookie is a cookie that mostly conforms to the HTTP protocol, though a cookie may be in alternate formats and conform to one or more of a variety of communication protocols. At least a portion of the data storage, including personal preferences and cookies may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, text, and graphics, and enable telecommunication with another user of another client device. Applications 242 may include a user-agent application that prepares communications for transmission and, preferably, includes identification information (or identifiers that can be associated with the identification information) about the mobile device, such as the mobile device type, mobile browser, and/or mobile carrier, in the header or body of such communications. Applications 242 may include one or more browsers 245 and one or more email clients 246. Other examples of application programs include calendars, IM applications, SMS applications, VOIP applications, contact managers, task managers, transcoders, database programs, word processing programs, security applications, spreadsheet programs, games, search programs, and so forth.

Illustrative Server Environment

Figure 3:
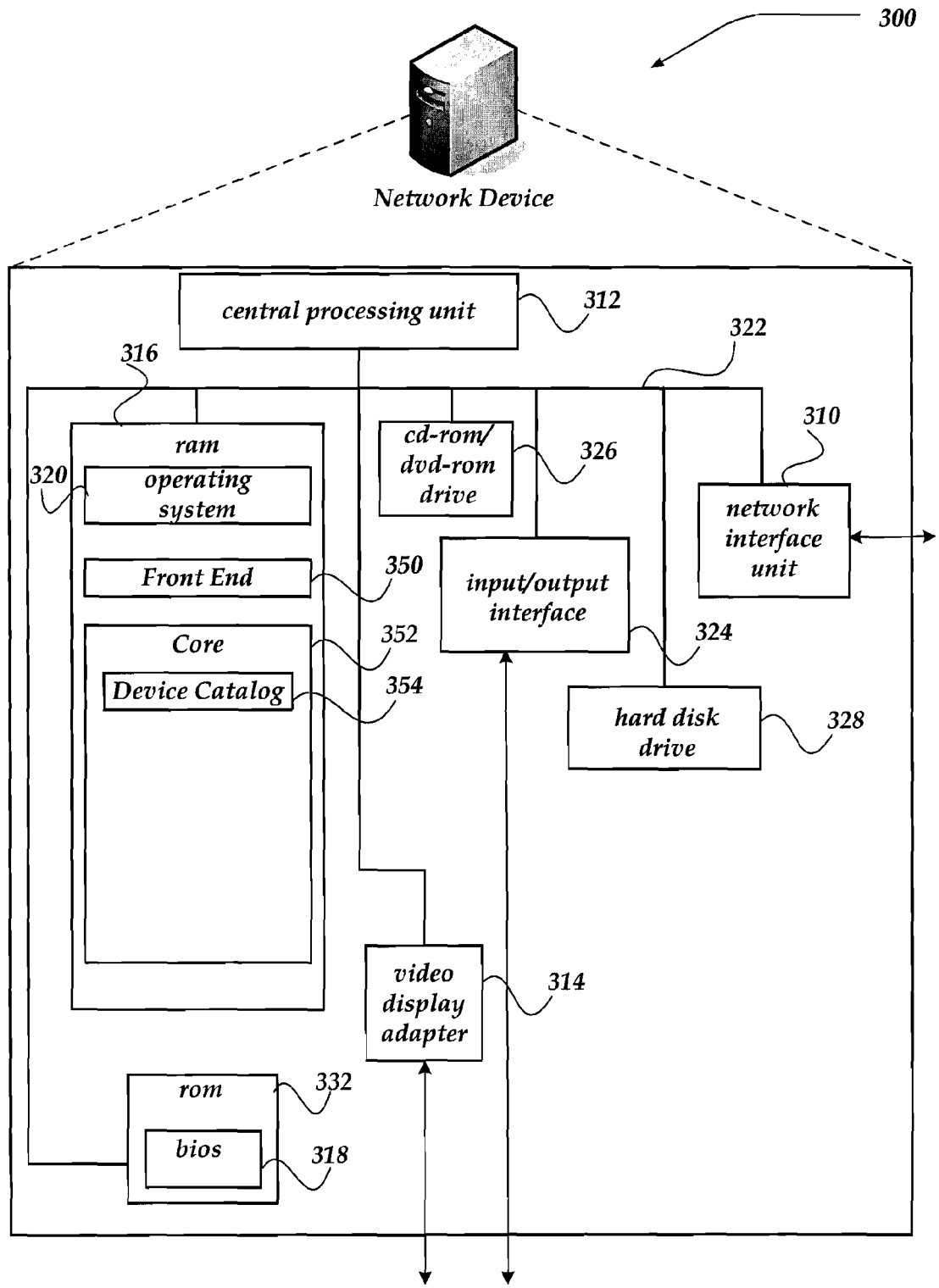
FIG. 3 shows one embodiment of a network device that may be included in a system implementing the invention.

FIG. 3 shows one embodiment of a mobile web gateway 300, according to one embodiment of the invention. A mobile web gateway is a network device having capabilities of processing requests from mobile devices such as mobile devices 102-108 of FIG. 1. The embodiment of mobile web gateway illustrated in FIG. 3 may be used to implement the mobile web gateway 114 of FIG. 1. Mobile web gateway 300 may include many more components than those shown. It may also have less than all of those shown. The components shown, however, are sufficient to disclose an illustrative embodiment for practicing the invention.

Mobile web gateway 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of mobile web gateway 300. Any general-purpose operating system may be employed. Basic input/output system ("BIOS") 318 is also provided for controlling the low-level operation of mobile web gateway 300. As illustrated in FIG. 3, mobile web gateway 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications are loaded into mass memory and run on operating system 320. As illustrated in FIG. 3, applications include a front end 350 and a core 352. The front end 350 and the core 352 may be considered to be separate applications or a single application. For ease of description, each is referred to herein as a component that may reside within mobile web gateway 300. As illustrated in FIG. 3, core component 352 includes additional components, such as a device catalog component 354. Alternatively, the mobile web gateway may access a device catalog on another server. Detailed descriptions of this component is provided in figures and text that follow. Examples of other application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth.

Mobile web gateway 300 is configured to receive, from a variety of mobile devices, requests for data or services. Mobile web gateway may perform front end processing of received requests. Front end processing may include security analysis, such as anti-spam operations or protection against denial-of-service attacks, and extraction of identifying information and other data. Mobile web gateway 300 may perform additional processing, including determining data needed to respond to a request, retrieving the determined data, and sending the request and associated data to a connector application. Mobile web gateway may receive and process responses returned by the connector application. Processing responses may include adding fields such as header, footer, and advertisements to a response page, and formatting responses and manipulating graphics based on knowledge of the requesting mobile device and its associated network gateway. Mobile web gateway 300 may also perform security analysis of responses, such as anti-spam operations, prior to sending a response to a mobile device. Mobile web gateway 300 may employ processes substantially similar to that described below in conjunction with FIGS. 4 and 5.

Generalized Operation

Figure 4:
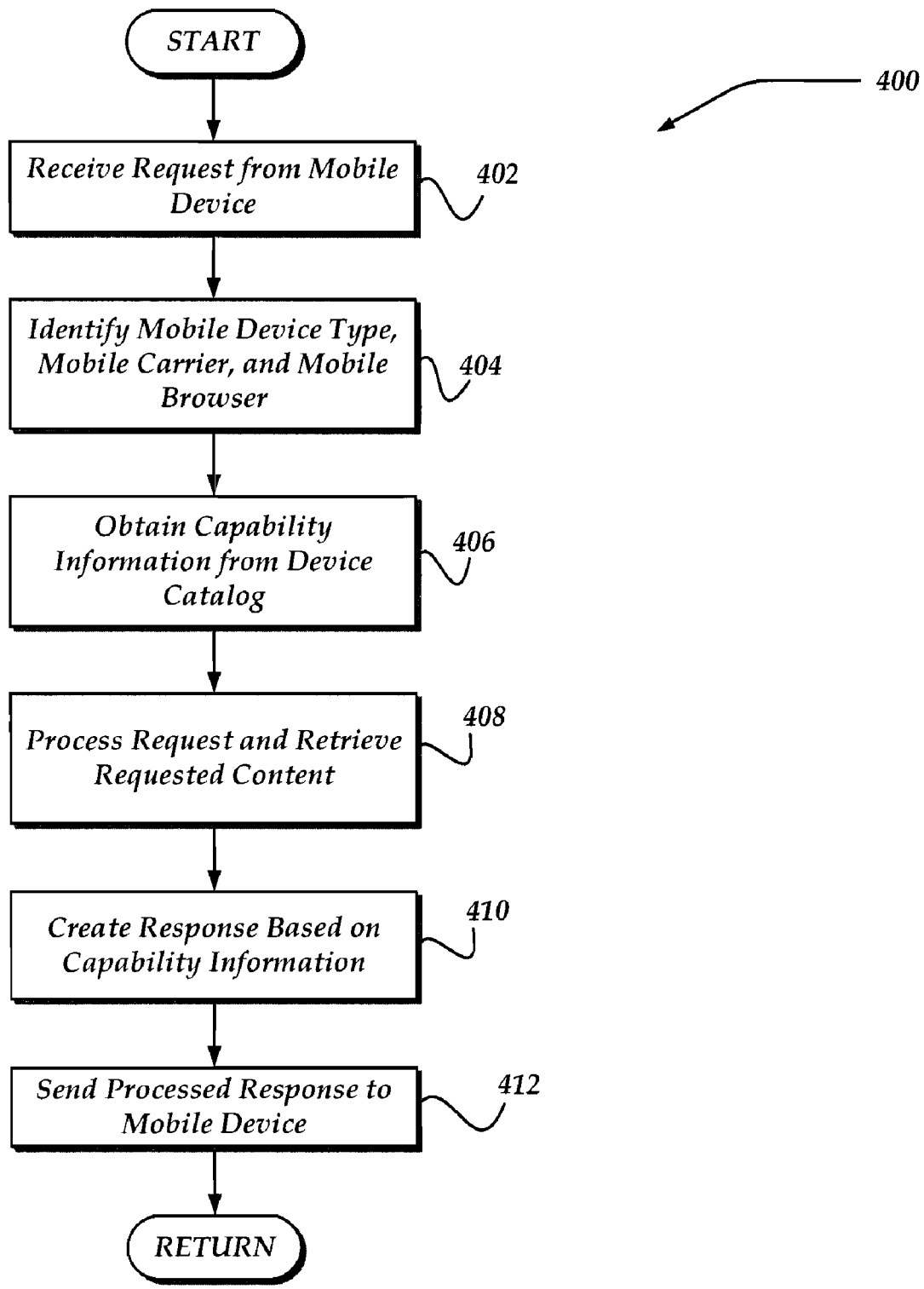
FIG. 4 illustrates a logical flow diagram generally showing one embodiment of a process for using a device catalog.

The operation of certain aspects of the invention will now be described with respect to FIG. 4. FIG. 4 illustrates a logical flow diagram generally showing one embodiment of an overview of a process for providing content to a mobile device using a device catalog. The device catalog provides capability information about the mobile device so that a system can retrieve requested content and tailor that content to the capabilities of the mobile device. Examples of capability information include, but are not limited to, hardware parameters, software information, standards met by the device, and bugs in the device hardware or software. For example, capability information may include, but is not limited to, the device display capabilities (e.g., display size, display resolution, availability of color, number of colors, font, graphics capabilities, jpg support, Java support and configuration, J2ME support and configuration, cascading style sheets support, Openwave (or other) icon support, and the like), multimedia capabilities, device memory (e.g., RAM, ROM, and the like), device audio capabilities, available software (e.g., names, versions, and the like), supported codecs, browser information (e.g., name, version, plug-ins, and the like), available communication protocols and capabilities, mobile carrier information (name of carrier, plan, and carrier preferred markup language for the mobile device), network characteristics, and the like. It will be recognized that an implementation of the present invention need not include consideration of each of the capabilities described above, or inclusion of that capability in the device catalog. Typically, a subset of the entire range of capability information will be maintained in the device catalog.

As shown, process 400 begins, after a start block, at block 402 where a request is received from a mobile device. A request can be any communication with the mobile device where the mobile device sends a signal to the system. For example, a request can be made for specific content (e.g., a webpage, e-mail, instant message, file, audio, video, sound and the like) or the request can be directed to establishing a connection with the mobile device prior to requesting particular content. As yet another example, the request can be directed to establishing an account with the mobile web gateway or another service.

Processing moves next to block 404, where information about the mobile device is identified. This identification information preferably includes at least the mobile device type (e.g., make and/or model of the mobile device), mobile carrier (e.g., the provider of services for the mobile device and, optionally, the carrier plan associated with the device), and the mobile browser (e.g., the name and version of the browser). Other information can also be identified such as, for example, information about the mobile device display or about communications protocols used by the mobile device. In one embodiment, the information may be represented using an identifier or other representation rather than the information itself. For example, an identifier can be used to represent a mobile device type rather than the make and/or model of the mobile device itself. Preferably, the identifier can be substantially reliably linked to that type of mobile device.

The information can be identified in a variety of ways. For example, in one embodiment, the information may be included in the request (e.g., in the header and/or body of the request). At least some mobile devices include a user agent application which provides at least a portion of this information (preferably, at least the mobile device type, or identifier that corresponds to the type, and mobile browser) in the request.

In another embodiment, the request may include an identifier that the system can then match to determine the information. For example, the IP address of the request might be used to identify the mobile carrier. In yet another embodiment, a combination of these techniques can be used where some of the information is provided with the request and other portions of the information is determined by matching an identifier. Examples of sources for the identification information include, but are not limited to, the user agent http header and an X-WAP-Profile header.

Process 400 moves next to block 406, where capability information is obtained from the device catalog using the information identified in block 404. The identification information (e.g., mobile device type, mobile carrier, and mobile browser) is matched in the device catalog to obtain information about the capabilities of the mobile device. Optionally, the device catalog may include sub-catalogs, such as a browser catalog or a carrier catalog, that may provide a portion of the capability information based on only subset of the identification information.

Processing then flows to block 408 in which the request is processed and any requested content, if applicable, is retrieved. Alternatively, subsequent to, or simultaneous with, determining the capability information the mobile device can request particular content. In at least some instances, the system will retrieve the requested content (e.g., a webpage, file, e-mail, instant message, and the like) from an external source such as web services 122-128 (FIG. 1).

Once the content is retrieved, the system creates a response to the request using the capability information as shown in block 410. This response typically includes at least a portion of the retrieved content, although it may also, or alternatively, include a message that the content (or a portion of the content) is not capable of, or available for, use with (e.g., display on) the mobile device. In creating the response to the request, the retrieved content may be modified based on the capability information for the mobile device. For example, the retrieved content, or portions of the retrieved content, may be reformatted, converted, deleted, divided into pieces for sequential display, or otherwise altered or presented in accordance with the capability information.

The processed response is then provided to the mobile device, as indicated in block 412. Delivery of the response may also be determined, at least in part, by the capability information for the mobile device. For example, the protocol used for delivery, the rate of delivery, whether the content is delivered all at once or in pieces, and the like may be selected in view of the capability information from the mobile catalog.

Figure 5:
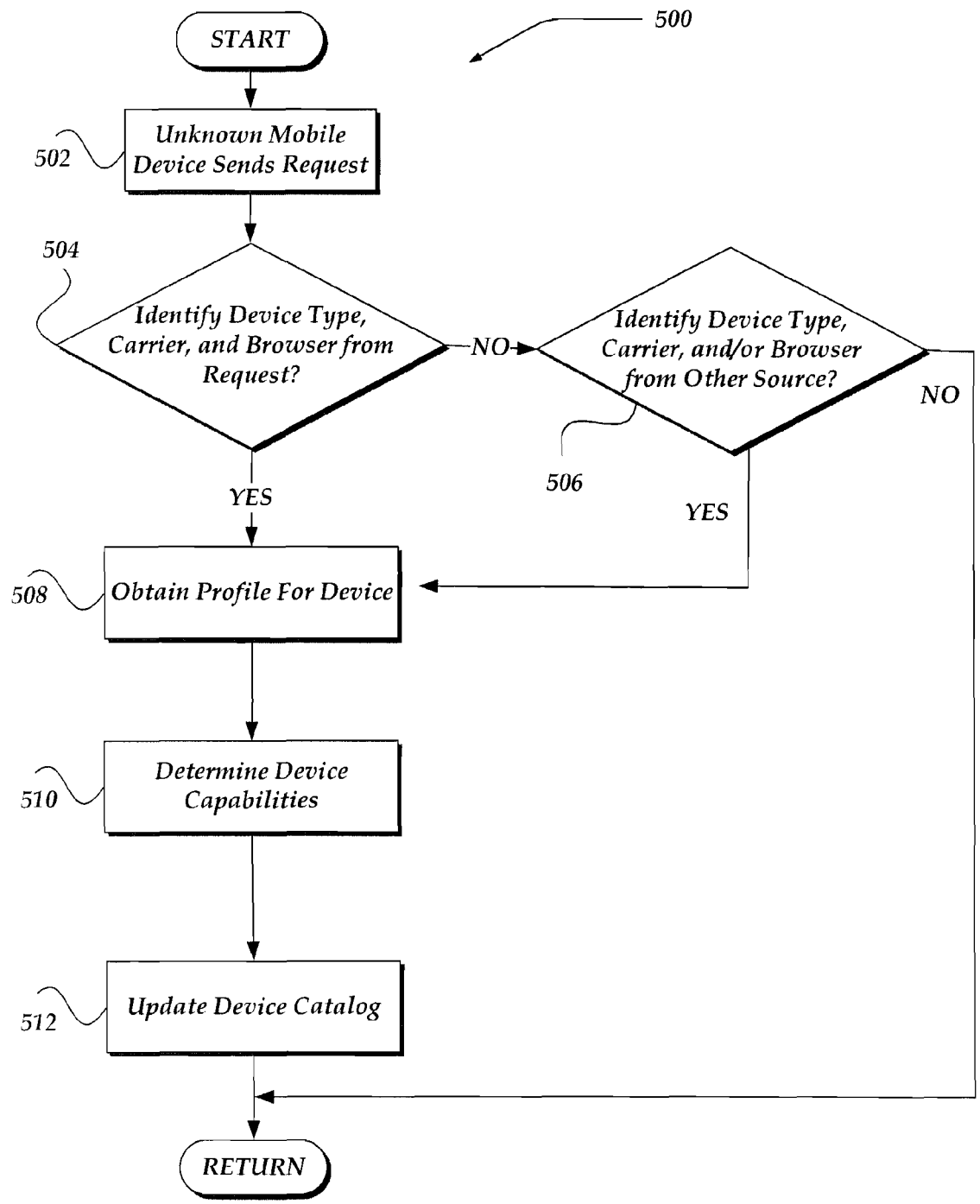
FIG. 5 illustrates a logical flow diagram showing one embodiment of a process for updating a device catalog.

FIG. 5 illustrates one embodiment of a method for adding an unknown mobile device to the device catalog. After a start block, the process continues with block 500 where an unknown mobile device sends a request. A server, such as the mobile web gateway 114 of FIG. 1, determines that the mobile device is unknown if the mobile device is not found in the device catalog. Processing then continues, to decision block 504 where it is determined whether the mobile device type, mobile carrier, and mobile browser can be identified from the request. Preferably, this identification information is provided in the header, body, or other portion of the request. In some instances, the request may include an identifier that the system can correlate to at least a portion of the identification information.

If the identification information can not be determined from the request, then the process optionally continues to decision block 506 where the system determines whether the identification information from another source. Such identification information may be provided by, for example, the mobile carrier, mobile device manufacturer, or another party. In one embodiment, the system includes an automated process to search for the information. In another embodiment, the system alternatively, or additionally, includes a procedure for manually searching for the information. In yet another embodiment, the request is analyzed to make an assumption as to the proper identification information. For example, an identifier (e.g., a user-agent identifier) in the request may be designated as the same as a similar, but not identical, identifier already found in an entry in the device catalog. Further processing can then occur using the assumed identification information. In at least some instances, feedback over time may verify whether this assumption is correct or not.

If the identification information is not found, the device catalog may not be updated for the unknown device and the request may be discarded or ignored. In another embodiment, the procedure may continue with block 508 using incomplete identification information, if such is found.

Once the information regarding mobile device type, mobile carrier, and mobile browser is identified, the process proceeds to block 508 and a device profile is obtained. The device profile can be obtained from any internal or external source. In some embodiments, the device profile is obtained from an external source such as the mobile carrier, mobile device manufacturer, or another party (e.g., another catalog of mobile devices). The device profile may be, for example, a Resource Definition File (RDF) profile. In one embodiment, this profile is obtained from a website containing the profile. In some instances, a link for the RDF profile may be included in the request. In one embodiment, the link is to a website that includes a XML file (or other suitable file) containing the RDF profile.

In addition to a device profile, in some embodiments, the system may also obtain a profile for a mobile carrier, mobile carrier plan, or mobile browser to assist in determining device capabilities. Alternatively, or additionally, these profiles may be created manually by the system operator or any other party.

After receiving the mobile device profile, the device capabilities are determined as indicated in block 510. The device capabilities are determined, at least in part, using the identification information and mobile device profile. This determination may be performed automatically or manually or any combination thereof including, but not limited to, by manual oversight of an automated process. Once the device properties are determined the device catalog can be updated, as indicated in block 512. In one embodiment, a master device catalog is first updated and then local device catalogs on local servers are updated on a periodic basis. The update period can be a regular or irregular interval. For example, the local device catalogs may be updated at a regular interval in the range of 1 to 24 hours.

Figure 6:
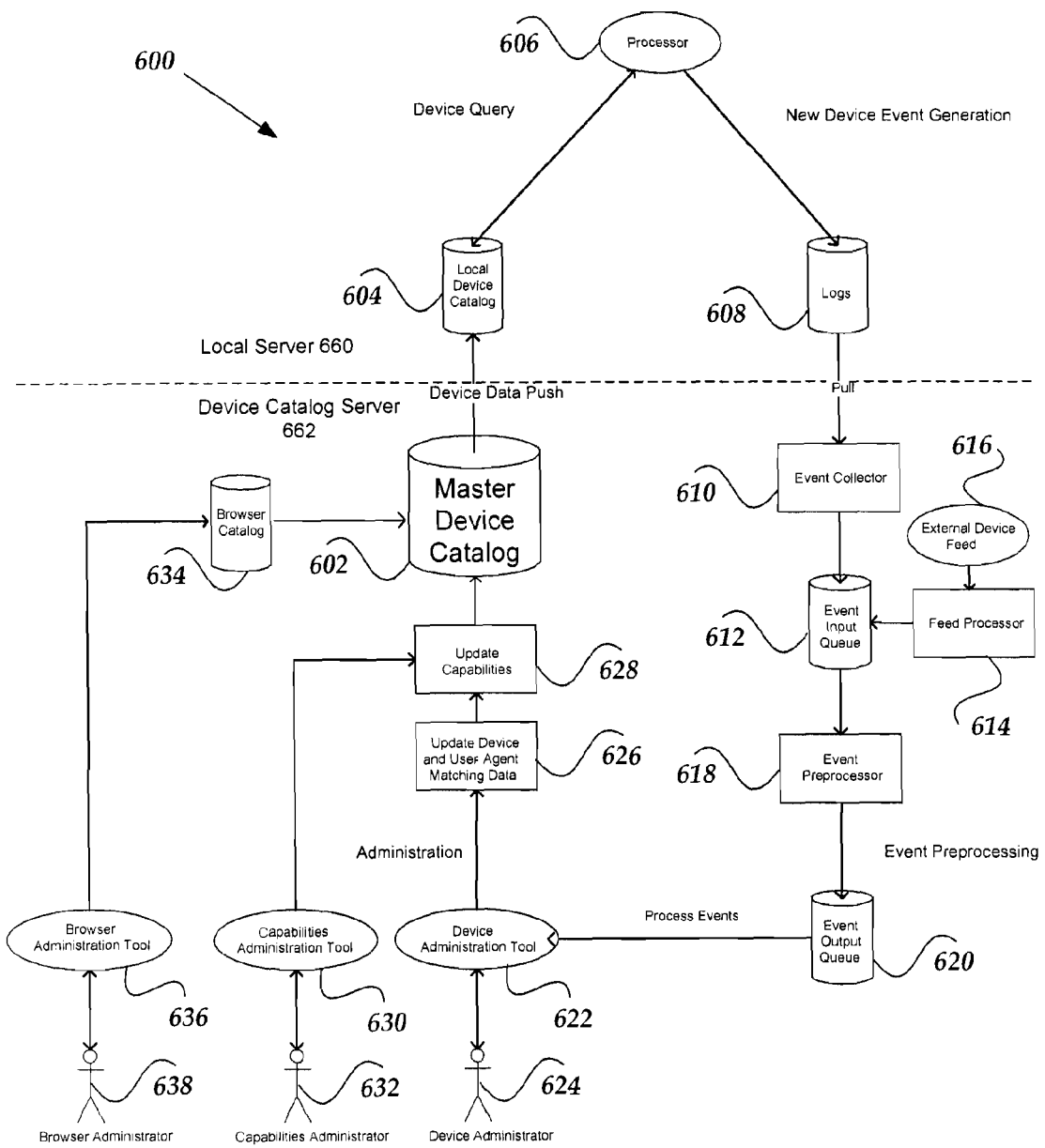
FIG. 6 illustrates one embodiment of a system for updating a device catalog.

FIG. 6 illustrates one embodiment of an arrangement 600 for updating a device catalog. It will be recognized that other suitable arrangements can have more or fewer components and that the components can be arranged in different configurations. The arrangement 600 includes a master device catalog 602 resident on a device catalog server 662 and multiple local device catalogs 604 each of which is resident on, or available to, one of multiple local servers 660. As the master device catalog is updated, it periodically updates the local device catalogs. The updating interval may be regular or irregular. In some embodiments, the updating interval may be in the range of 1 to 24 hours. In another embodiment, one or more of the local servers may query the master device catalog instead of a local device catalog.

When a processor 606 receives a request from a mobile device, it consults the local device catalog 604 to obtain capability information for the mobile device. If the local device catalog 604 does not contain the capability information for the requesting mobile device, the processor creates an event on an event log 608. An event collector 610 on a device catalog server 662 collects the events from the event log 608 from each of the local servers 660. Alternatively, events at a local server can be directed by the local server to the device catalog server. It will also be understood that the events collector can be on a device other than the device catalog server 662.

The event collector 610 provides the logs to an event input queue 612. A feed processor 612 evaluates each event in the event input queue 612 to determine whether the event includes sufficient identification information to obtain a mobile device profile as described above with respect to blocks 504-506 of FIG. 5. If sufficient information is provided, the profile is obtained from an external device feed 616 such as a website, data file, or the like. If there is not sufficient information, the event may be discarded or a profile may be obtained, if available, or generated using the existing information.

Once a profile has been obtained, the profile/event can be forwarded to a preprocessor 618 which can perform functions such as putting the profile in a desired form or format, discarding unwanted information from the profile, and/or eliminating duplicates. The preprocessor may also perform other filtering functions.

The preprocessed profile/event is then provided to an event output queue 620 for further processing by a device administration tool 622. This tool 622 evaluates the profile and determines whether or not the profile should be admitted to the device catalog. The tool 622 may be overseen by a device administrator 624 who may approve, override, or supplement decisions by the device administration tool. In some instances, the mobile device may already be registered in the device catalog (typically with information from a different source) and the tool 622 may add new information or modify existing information based on the profile.

If the event/profile is to be added to the device catalog, then a catalog entry is created for the mobile device and the catalog entry is matched with any user-agent data (block 626) for the unknown mobile device. This may be particularly useful when the user-agent data provided with a request from the mobile device does not specify all of the desired identification information. Once the mobile device has been added to the catalog, the user-agent data can be utilized to identify the device in the device catalog. In one embodiment, the user-agent data uniquely identifies the mobile device, but the same mobile device may include different user-agents that provide different data or data in a different format. The user-agent is typically matched with the appropriate mobile device. In some instances, the device catalog may include multiple user-agents matched with the same mobile device.

The catalog entry is also updated with the device capabilities (block 628) that are determined at least in part from the profile using the capabilities administration tool 630. This tool may be overseen by a capabilities administrator 632 who may approve, override, or supplement decisions by the capabilities administration tool. The catalog entry is then provided to the master device catalog 602. It will be recognized that the catalog entry can also take the form of other data types, such as a separate file within the device catalog.

In one embodiment, the catalog entry includes capability information for a specific device and does not reference any other catalog entry. In another embodiment, a catalog entry for a particular mobile device may reference the catalog entry for another (typically similar) mobile device and include any differences in the capabilities of the two mobile devices. This arrangement may be particularly useful, for example, when different models from the same manufacturer have similar capabilities. In yet another embodiment, a single catalog entry may be designated as applicable to multiple mobile devices. This may be particularly useful, for example, when multiple model numbers are used for the same mobile device or several substantially similar mobile devices.

Generally, the device capabilities are determined in view of the mobile device type and, optionally, the mobile carrier and mobile browser. In some embodiments, separate catalogs (preferably, as part of the device catalog) can be maintained for browsers or carriers and these catalogs can be used to provide device capability information. For example, FIG. 6 illustrates a browser catalog 634 that is generated using a browser administration tool 636 overseen by a browser administrator 638. The browser catalog 634 is provided to the master device catalog 602. The browser catalog 634 can be used to modify the capability entries for individual mobile devices or, when requested by the processor 606, the capability entry for the particular mobile device and the particular browser entry for the mobile browser can be provided to the processor by the local device catalog 604. The processor can then process content in view of each of these entries.

It will be recognized that entries into the device catalog can also be generated by other methods. For example, entries may be provided to the device catalog (or to one of the administrators 624, 632, 638) from a mobile device manufacturer, mobile carrier, or other party. Entries might also be generated from known information, or from other databases, without requiring that the corresponding mobile device generating a request. This may be useful when, for example, a large mobile device manufacturer introduces a new mobile device product or a new browser or browser version is introduced.

The system may also include a feedback mechanism which allows mobile device users and others to report problems with the content delivered to the mobile device. These problems can be investigated and the device catalog modified, as desired or appropriate, to correct or modify the capability information for a particular mobile device, browser, or carrier.

Figure 7:
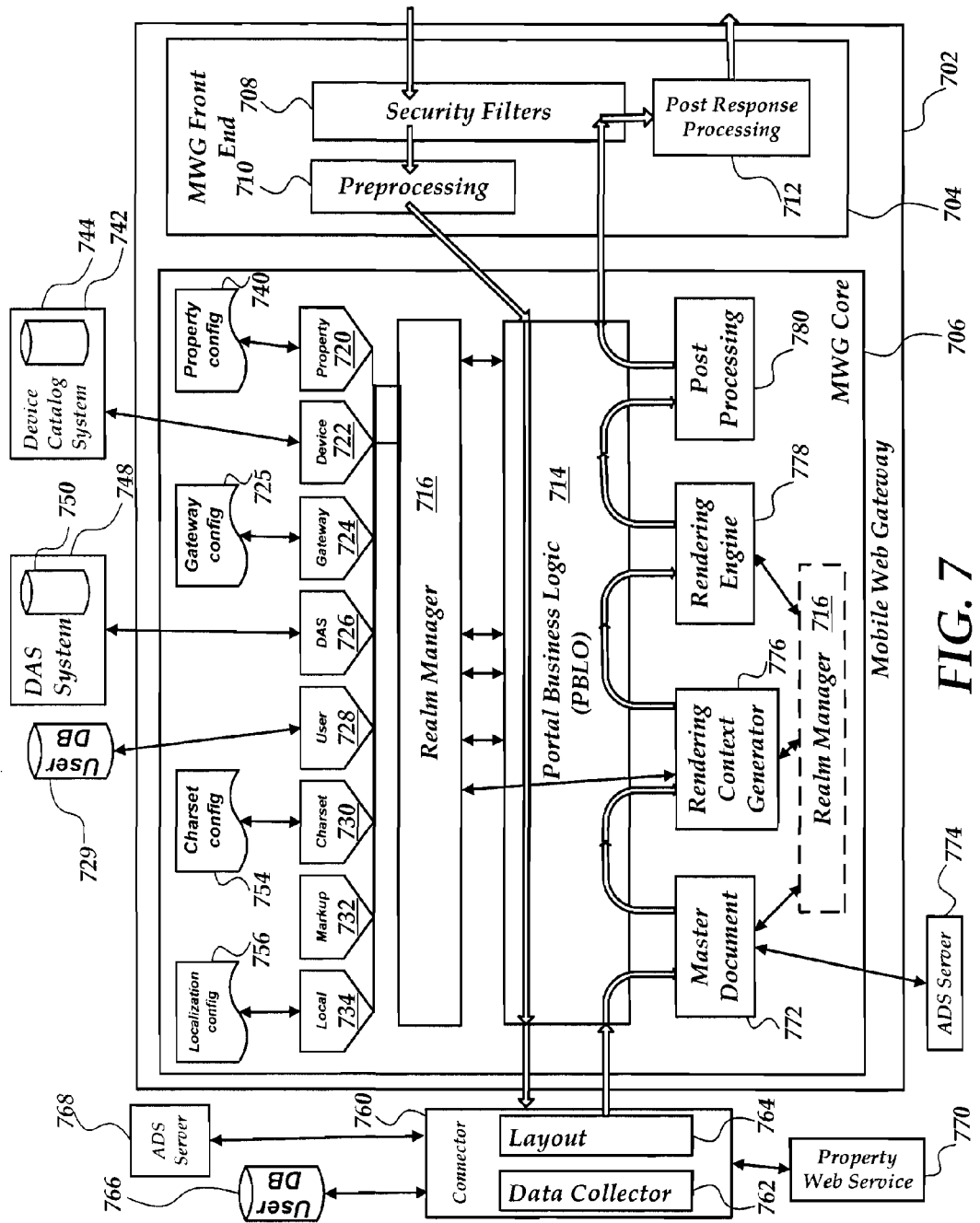
FIG. 7 is a system diagram of one embodiment of a system in which the invention may be practiced.

FIG. 7 illustrates one embodiment of a system 700 in which the invention may be practiced. It will be understood, however, that a device catalog, as described herein, can be used with many other systems. The figure includes more detailed views of a mobile web gateway 702, which may be mobile web gateway 114 of FIG. 1, and a connector application 760, which may be one of the connectors 116-120 of FIG. 1, as well as additional associated components.

As illustrated in FIG. 7, one embodiment of a mobile web gateway (MWG) 702 includes an MWG front end 704 and an MWG core 706. The MWG front end 704 logically resides between the MWG core and mobile devices. The MWG front end 704 includes a security filter component 708, which performs operations to detect security risks, such as denial-of-service attacks, spam, viruses, hacking attempts, and the like. The security filter component may include one or more filters to perform its tasks. The security filter component 708 may operate on requests that come to the MWG front end from a mobile device as well as responses that come from connectors or are internally generated within the MWG 702.

The MWG front end 704 also includes a preprocessing component 710. The preprocessing component extracts data from the incoming request, including data that identifies the source of the request. The preprocessor may extract the MIN and the source IP address from the request. The MIN may be used to identify the mobile device. The IP address may be used to identify the network, such as one of network gateways 110, 112 (FIG. 1). Since a network gateway is typically associated with a network carrier, identification of the network gateway typically identifies the carrier. Sprint, T-Mobile, and Cingular are examples of network carriers. A carrier may employ more than one gateway.

The illustrated MWG front end 704 also includes a post response processing component 712. This component may store data relating to the request and/or the response, the data being available for subsequent reporting or other activities.

The MWG core 706 illustrated in FIG. 7 includes a portal business logic (PBLO) component 714. In one embodiment, the PBLO has much of the business logic and is the primary manager of actions for handling a request and a response. The PBLO 714 interacts with and invokes a number of other components.

The realm manager 716, which resides within the MWG core in the illustrated embodiment, manages realms in the mobile domain. Each realm relates to an area of knowledge within the broader mobile domain. The realms relate to attributes of mobile devices, network gateways or carriers, mobile device users, and the like. Each realm includes a set of one or more parameters, described in more detail below.

In one embodiment of the invention, as illustrated by FIG. 7, each realm has a corresponding realm component that handles the parameters of its respective realm. In one embodiment, these realm components are implemented as plug-ins, providing an architecture that facilitates changes to the components and the addition of new components. The realm components may be structured in a different manner, and combined or distinguished in a number of ways. As discussed herein, the realm components are referred to as plug-ins, though alternate architectures may be used.

The realm manager 716 provides functionality for registering realm plug-ins, and for communicating with realm plug-ins. The realm manager also provides an interface to allow MWG components to retrieve data pertaining to each realm.

FIG. 7 illustrates a subset of realm plug-ins that may be employed with one embodiment of the invention. A description of the illustrated plug-ins, and their associated realms, follows. One or more additional plug-ins (not shown) may be used with the realm manager 716 in accordance with the present invention.

Property Realm. The property realm contains the definition of each connector. It has information relating to each connector application, including the various realm data or other data that a connector application may need to process a request. The property plug-in 720 manages the property realm data. A property configuration component 740 stores property realm configuration data, which may be configured by a connector or a developer of a connector. In one embodiment, configuration is performed by a registration process, in which a connector registers with the MWG 702. Registration information may include a connector address, list of URIs to be handled by the connector, and the data that is required by the connector. The PBLO 714 may communicate with the property plug-in 720 to determine at least some of the data that must be retrieved to process an incoming request, including data that must be sent to the connector.

The realm manager 716, together with the realm plug-ins 720-734 and the various stored data can be viewed as a dictionary of items and values. A connector may register the dictionary items that it needs to process a request. During request processing, the set of items associated with the connector and the request are determined by invoking the property plug-in 720, and the value corresponding to each dictionary item is obtained.

Device Realm. The device realm includes information relating to each mobile device, such as mobile devices 102-108 of FIG. 1. The device plug-in 722 manages the device realm. It communicates with and retrieves data from a device catalog system 742 as described above. The device catalog system may include capability information for mobile devices. This capability information may include, for example, screen size, number of lines that can be displayed, color capabilities of the device, image formats supported, markup languages supported, video capabilities, and the like. The device catalog system 742 may employ a local device catalog 744, to maintain device specification data.

Gateway Realm. The gateway realm includes information relating to each network gateway, such as network gateways 110, 112 of FIG. 1. This information may include a list of IP addresses used by each network gateway, whether a network gateway supports cookies, whether a network gateway provides MIN numbers for mobile devices, and the like. The gateway plug-in 724 manages the gateway realm. It may be used, for example, for identifying a carrier from an incoming IP address. The gateway plug-in 724 may communicate with a gateway configuration component 725, which may store configurations of each gateway.

Localization Realm. The localization realm includes information that is used to localize responses. This may include data on geographical regions, languages, currencies, and the like. The localization plug-in 734 manages the localization realm. The localization plug-734 in may communicate with a localization configuration component 756, which may be used to store localization information.

Markup Realm. The markup realm includes information relating to markup languages to use when sending a response. A decision as to which markup language to use may be based on one or more of a number of factors, including the mobile device, the current request, the client application, the carrier, the geographic region, and the like. Though the device realm includes information relating to the markup language capabilities that a device may have, the markup plug-in 732 may use additional parameters, such as described above, to determine the markup language to use. Some, but not all, of the markup languages that may be used are WML, XHTML, HDML, XML, and HTML. This realm may also include information on scripting languages to use, such as WML-Script and JavaScript. The markup plug-in 732 manages the markup realm.

Device and Session (DAS) Realm. The DAS realm relates to session management. The DAS plug-in 726 manages the DAS realm. The DAS plug-in 726 may maintain continuity of a user session. For example, the DAS plug-in may maintain a sign-in status of a user. This is useful for mobile devices that do not support cookies. The DAS plug-in 726 may retain knowledge of an ongoing session, so that the session is recognized when making a request, after having previously signed in. The DAS plug-in may use a mobile devices MIN number or cookie to identify and maintain a session. In one embodiment, the DAS plug-in 726 may generate a unique identifier associated with a session, send the unique identifier in a URI returned to the mobile device, and use the identifier on a subsequent request to identify and maintain a session. The DAS plug-in 726 may communicate with a DAS system component 748, which stores DAS data in a DAS database 750.

In one embodiment, cookies may be stored in the DAS system 748. For example, a connector may send a cookie to a mobile device. The MWG 702 may recognize that the mobile device does not support cookies. The cookie is then sent to the DAS system for storage. The next time that a request comes in from the user or the mobile device, the DAS plug-in 726 may retrieve the appropriate cookie and send it with the request to the connector. It may appear to the connector that the cookie came from the mobile device. The DAS plug-in 726 may modify the cookie, prior to storing it or prior to sending it, as desired in order to facilitate operation of the system.

User Realm. The user realm relates to a user of a mobile device, for users that have an account. A user plug-in 728 maintains user information, such as user ID. A MIN number may be mapped to a user ID, such that, based on the MIN number, the user plug-in 728 can identify a user and access a user database 729 and retrieve additional user information. Additional information may include, for example, information that the user entered or that was determined during a previous session from a device other than the currently used mobile device, such as a personal computer or another mobile device.

Character Set. The character set realm relates to character sets used by a mobile device. The charset plug-in 730 manages information relating to character sets, and retrieves the relevant data. The charset plug-in may employ a charset configuration component 754 to store and maintain character set information. Unicode is a commonly used standard character set, but some mobile devices do not use Unicode, or use variants of Unicode. The charset plug-in may determine the appropriate character set to use, and retrieve data related to the selected character set.

Upon retrieving the relevant realm data, the PBLO component 714 sends the mobile device request, along with at least a portion of the relevant realm data, to a connector 760. The relevant data sent to the connector 760 may include a cookie, session information, user information, or any of the various data that is retrieved by the realm manager 716. The connector may be one of the connectors 116-120 of FIG. 1.

As illustrated in the embodiment of FIG. 7, a connector 760 may include a data connector 762, which, based on the request, retrieves additional data. The data connector may communicate with one or more Web services, such as Web services 122-128 (FIG. 1) to retrieve data. Data may be returned from a web service in any one or combination of formats. XML is one standard format that may be used. One such Web service, a property web service 770, is illustrated in FIG. 7. The communication between the connector 760 and the web service 770 may include a cookie being passed to the web service or from the web service. The connector may receive a cookie from the MWG 702, forward the cookie to the web service 770, and receive a cookie back from the web service. The MWG 702, the connector 760, or the web service 770 may modify the cookie during this process.

The data collector 762 may also access various databases or servers to retrieve data. As illustrated in FIG. 7, in one embodiment, the connector 760 accesses a user database 766. The connector may retrieve data, modify or add new data related to the user, based on the received request. The connector 760 may also access an ADS server 768, which provides banner ads or other types of advertisements, to be included in the response.

The connector 760 may further include a layout component 764, which is used to generate and layout a response page based on retrieved data. The response page may be in any one or more formats, including various markup languages.

The connector 760 sends a response to the MWG 702, which is received by the PBLO component 714. The PBLO component directs processing by one or more components, which expand, modify, or otherwise enhance the response prior to sending it to the mobile device. Each of these components may communicate with the realm manager 716 as needed to obtain the data that has been retrieved or additional data that may be necessary and has not been retrieved. A discussion of some of these components now follows.

A master document component 772 may be used to combine additional fields to the response page received from the connector 760. The possible additional fields include, but are not limited to, one or more of a header field, a footer field, and advertisement fields. As illustrated in FIG. 7, the master document component 772 may communicate with an advertisement server 774 to retrieve one or more advertisements to be place on the response page.

A rendering context generator 776 uses at least some of the data retrieved by the realm manager 716 to generate a rendering context. The rendering context is a data structure that contains the various parameters and data needed to modify the response page for the specific mobile device that is to receive the response.

A rendering engine 778 uses the data from the rendering context to modify or enhance the response page for the mobile device. As previously discussed, modifying the response page may be based on one or more of a number of parameters, including the capability information obtained from the device catalog. Examples of parameters include screen size, color capabilities, markup language, known bugs in a software or hardware version of the mobile device or network gateway, and the like. The rendering engine 778 may rewrite links or URIs within the response. For example, if the response includes a link to an image in one format, the post-processing component may modify the link to an alternate image in a different format, if the target mobile device is unable to display the first format. A link may also be rewritten to include a parameter, such as a value to identify a continuing session, so that a new request using the link will return the session identifier.

A post-processing component 780 may perform additional processing on the response page. This processing may include retrieving and embedding images that are in the response. For example, if a response page is in XML format, and includes a link to an image, the post-processing component 780 may retrieve the image and embed it within the XML page as base 64 encoded data or another format.

The MWG front end 704 illustrated in FIG. 7 includes a post response processing component 712. This component may perform actions such as logging data related to the request or the response. The logged data may subsequently be used for various reporting activities.

The response that is generated by various components and processes of the MWG 702 is sent to the target mobile device. This may be the mobile device that sent the initial request, or a different device.

Though the above discussion refers to the use of markup languages, the invention is not so limited. Client applications on a mobile device may send and accept data in a number of formats, including XML, binary XML, and others. The invention may be employed with these and other various data formats.

FIG. 7 and the above discussion illustrate that the present invention provides a way for a network application, such as connector 760, to implement business and application logic when responding to a request, and to layout a response page, while reducing or eliminating the tasks of tailoring a response to accommodate at least a portion of the mobile device attributes and capabilities. A connector may receive identical or similar requests from multiple mobile devices, and generate identical or similar responses to each request. The MWG 702 performs processing to enhance these responses for each mobile device based on each device's attributes, resulting in different response pages for each mobile device. The connector does not need to be aware of many of these differences or of the different enhancements that occur.

FIG. 7 and the above discussion also illustrate that the present invention provides a way for a network application, such as connector 760, to retrieve information for handling each request from different mobile devices. Though mobile devices may differ in the way then send information, or in their ability to even send some information, such as cookies or session IDs, the MWG 702 performs processing to retrieve, store, or generate information as necessary in order to send the information to the connector. The connector does not need to be aware of the different processing that may be required to retrieve and store the information.

The examples provided should not be construed as narrowing the embodiments of the invention, and are intended merely to provide a better understanding. Thus, other mechanisms may therefore be employed, without departing from the scope of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. An apparatus that is operative to prepare content for use on an unknown mobile device, comprising:
   a master mobile device catalog configured, and arranged to provide capability information based on a combination of a mobile device type, a mobile carrier, and a mobile browser; and
   a processing component for executing instructions that enable actions, including:
      receiving a request from the unknown mobile device over a mobile carrier, wherein the unknown mobile device is unknown in a local mobile device catalog and the master mobile device catalog, wherein the local mobile device catalog is different from the master mobile device catalog;
      identifying, the mobile device type, the mobile carrier, and the mobile browser of the unknown mobile device from the request and an IP address of the unknown mobile device;
      obtaining capability information for the unknown mobile device based on each of the mobile device type, the mobile carrier, and the mobile browser of the unknown mobile device as identified from the request;
   updating the master mobile device catalog with the capability information; and
   delivering content responsive to the request based on the obtained capability information, wherein the capability information is used in part to determine at least one of a protocol used for delivery, a rate of delivery, or whether the content is delivered all at once or in pieces.

2. The apparatus of claim 1, wherein the master mobile device catalog comprises a browser catalog.

3. The apparatus of claim 1, wherein the local mobile device catalog is configured and arranged to obtain periodic updates from the master mobile device catalog.

4. The apparatus of claim 1, wherein the processing component executes instructions that enable identifying the mobile carrier plan associated with the unknown mobile device.

5. The apparatus of claim 1, wherein the processing component executes instructions that enable modifying the content: responsive to the request in view of the capability information for the unknown mobile device.

6. A processor-readable non-transitory medium having processor-executable instructions for managing content for use on an unknown mobile device over a network, the processor-executable instructions when installed onto a computing device enable the computing device to perform actions, comprising:
   receiving a request from the unknown mobile device over a mobile carrier, wherein the unknown mobile device is unknown in a local mobile device catalog and a master mobile device catalog, wherein the local mobile device catalog is different from the master mobile device catalog;
   identifying a mobile device type, the mobile carrier, and a mobile browser of the unknown mobile device from the request and an IP address of the unknown mobile device;
   obtaining capability information for the unknown mobile device based on each of the mobile device type, the mobile carrier, and the mobile browser of the unknown mobile device as identified from the request;

updating the master mobile device catalog with the capability information; and delivering web content responsive to the request based on the obtained capability information, wherein the capability information is used in part to determine at least one of a protocol used for delivery, a rate of delivery, or whether the content is delivered all at once or in pieces.

7. The processor-readable non-transitory medium of claim 6, further comprising enabling the computer device to modify the web content based on the capability information.

8. The processor-readable non-transitory medium of claim 7, further comprising providing the modified web content to the unknown mobile device.

9. A system useable in managing content for use on an unknown mobile device, comprising:

a web service that is arranged to provide the content, wherein the content is configured independent of the unknown mobile device, wherein the unknown mobile device is unknown in a local mobile device catalog and a master mobile device catalog, wherein the local mobile device catalog is different from the master mobile device catalog; and a server that is coupled to the web service, and is operative to perform actions, including:

receiving a request from the unknown mobile device over a mobile carrier;

identifying a mobile device type, the mobile carrier, and a mobile browser of the unknown mobile device from information included in the request and an IP address of the unknown mobile device;

obtaining capability information for the unknown mobile device based on each of the mobile device type, the mobile carrier, and the mobile browser of the unknown mobile device as identified from the request;

updating the master mobile device catalog with the capability information; and delivering the content based on the obtained capability information, wherein the capability information is used in part to determine at least one of a protocol used for delivery, a rate of delivery, or whether the content is delivered all at once or in pieces.

10. The system of claim 9, further comprising a device catalog server comprising the master mobile device catalog configured and arranged for updating the local mobile device catalog.

11. The system of claim 9, wherein the server comprises the local mobile device catalog.

12. The system of claim 9, wherein the mobile device type is identified using an identifier other than the make or model of the unknown mobile device.

13. A method of managing a master mobile device catalog, comprising:

receiving a request from an unknown mobile device over a mobile carrier, wherein the unknown mobile device is unknown in a local mobile device catalog and the master mobile device catalog, wherein the local mobile device catalog is different from the master mobile device catalog;

identifying at least a mobile device type and the mobile carrier for the unknown mobile device from the request and an IP address of the unknown mobile device;

obtaining a profile for the unknown mobile device based on the mobile device type and the mobile carrier, as identified from the request;

determining capability information for the unknown mobile device, at least in part from the mobile carrier of the profile;

updating the master mobile device catalog with the capability information; and delivering content responsive to the request based on the capability information, wherein the capability information is used in part to determine at least one of a protocol used for delivery, a rate of delivery, or whether the content is delivered all at once or in pieces.

14. The method of claim 13, further comprising identifying the mobile browser for the unknown mobile device, wherein determining the capability information comprises determining capability information for the unknown mobile device, at least in part from identification of the mobile browser.

15. The method of claim 13, wherein obtaining a profile comprises obtaining a profile from an external source.

16. The method of claim 13, further comprising updating a plurality of local device catalogs using the master mobile device catalog.

* * * * *

UNITED STATES PATENT AND TRADEMARK OFFICE
CERTIFICATE OF CORRECTION

PATENT NO. : 8,224,308 B1
APPLICATION NO. : 11/537324
DATED : July 17, 2012
INVENTOR(S) : Olga Volodymyrivna Gavrylyako et al.

It is certified that error appears in the above-identified patent and that said Letters Patent is hereby corrected as shown below:

On the Title page, in Item (56), under "Other Publications", in column 2, line 5, delete "Wilkmedia" and insert -- Wikimedia --, therefor.

In column 20, line 10, in Claim 1, delete "configured," and insert -- configured --, therefor.

In column 20, line 22, in Claim 1, delete "identifying," and insert -- identifying --, therefor.

In column 20, lines 48-49, in Claim 5, delete "content:" and insert -- content --, therefor.

Signed and Sealed this
Fourth Day of September, 2012

David J. Kappos
*Director of the United States Patent and Trademark Office*